(12) United States Patent
Hashimoto et al.

(10) Patent No.: US 8,770,589 B2
(45) Date of Patent: Jul. 8, 2014

(54) SHAFT-SEAL DEVICE FOR HIGH-TEMPERATURE FLUID

(75) Inventors: Taiji Hashimoto, Toshima-ku (JP); Tao Hu, Toshima-ku (JP); Eiji Okumachi, Sanda (JP); Masanobu Ninomiya, Sanda (JP)

(73) Assignees: Nippon Pillar Packaging Co., Ltd., Osaka (JP); Hitachi, Ltd., Tokyo (JP)

( * ) Notice: Subject to any disclaimer, the term of this patent is extended or adjusted under 35 U.S.C. 154(b) by 102 days.

(21) Appl. No.: 13/532,498

(22) Filed: Jun. 25, 2012

(65) Prior Publication Data

US 2012/0326394 A1 Dec. 27, 2012

(30) Foreign Application Priority Data

Jun. 27, 2011 (JP) ................................. 2011-142127

(51) Int. Cl.
*F16J 15/34* (2006.01)
(52) U.S. Cl.
USPC ........... 277/358; 277/359; 277/361; 277/366; 277/367; 277/368; 277/369; 277/370; 277/391; 277/408
(58) Field of Classification Search
USPC ......... 277/361, 366, 367, 368, 369, 358, 359, 277/370, 390, 391, 408
See application file for complete search history.

(56) References Cited

U.S. PATENT DOCUMENTS

| | | | | | |
|---|---|---|---|---|---|
| 3,334,905 | A | * | 8/1967 | Horwitz et al. ............... | 277/365 |
| 4,094,512 | A | * | 6/1978 | Back ............................ | 277/320 |
| 4,183,540 | A | * | 1/1980 | Hytonen ....................... | 277/388 |
| 5,421,593 | A | * | 6/1995 | Aritsubo et al. .............. | 277/361 |
| 5,938,205 | A | * | 8/1999 | Azibert et al. ................ | 277/361 |
| 5,938,206 | A | * | 8/1999 | Klosterman et al. .......... | 277/399 |
| 6,325,382 | B1 | * | 12/2001 | Iwamoto et al. .............. | 277/368 |
| 6,446,975 | B1 | * | 9/2002 | Bratthall ....................... | 277/366 |
| 6,494,458 | B2 | * | 12/2002 | Uth ............................... | 277/358 |
| 6,517,077 | B1 | * | 2/2003 | Enomura ...................... | 277/358 |
| 6,601,854 | B2 | * | 8/2003 | Auber ........................... | 277/377 |
| 6,655,693 | B2 | * | 12/2003 | Hosanna et al. .............. | 277/358 |
| 6,685,192 | B2 | * | 2/2004 | Takigahira et al. ........... | 277/408 |
| 6,932,348 | B2 | * | 8/2005 | Takahashi .................... | 277/359 |
| 7,370,864 | B2 | * | 5/2008 | Azibert ......................... | 277/358 |
| 7,878,509 | B2 | * | 2/2011 | Takahashi .................... | 277/359 |

(Continued)

FOREIGN PATENT DOCUMENTS

| | | |
|---|---|---|
| JP | 2001-349443 A | 12/2011 |
| WO | WO 2008/132958 A | 11/2008 |
| WO | WO 2008/142945 A | 11/2008 |

*Primary Examiner* — Vishal Patel
*Assistant Examiner* — Eugene G Byrd
(74) *Attorney, Agent, or Firm* — DLA Piper LLP (US)

(57) ABSTRACT

A shaft-seal device for high-temperature fluid including a seal case (2) formed as a metallic cylindrical structure of a single unit and comprised of a main body portion (2a, 2b, 2c), first and second holding portions (2d, 2e), first and second partition portions (2f, 2h), a channel formation portion (2g) forming a minute annular channel (27) with the outer circumference surface of a rotary shaft (1), and an o-ring holding portion (2i). The seal case is installed in an apparatus housing (8) with first and second o-rings (2m, 2n) in between. The intra-seal case region (A1), in which sealing rings (31, 32, 41, 42, 51, 52) of mechanical seals (3, 4, 5) are provided, and the high-temperature fluid region, which is an intra-apparatus housing region (A), are partitioned by a cooling chamber (28) into and from which coolant (82) is supplied and discharged via feed/discharge coolant paths (80, 81).

10 Claims, 9 Drawing Sheets

(56) References Cited

U.S. PATENT DOCUMENTS

| | | | |
|---|---|---|---|
| 2002/0074731 A1* | 6/2002 | Uth | 277/358 |
| 2002/0109302 A1* | 8/2002 | Muraki | 277/408 |
| 2003/0122313 A1* | 7/2003 | Takahashi | 277/358 |
| 2004/0173971 A1* | 9/2004 | Kudari et al. | 277/361 |
| 2004/0227297 A1* | 11/2004 | Azibert | 277/361 |
| 2005/0035554 A1* | 2/2005 | Roberts et al. | 277/358 |
| 2010/0270748 A1* | 10/2010 | Svejkovsky et al. | 277/358 |
| 2010/0270749 A1* | 10/2010 | Oshii et al. | 277/361 |
| 2011/0084454 A1* | 4/2011 | Quarmby et al. | 277/307 |
| 2011/0169225 A1* | 7/2011 | Winkler et al. | 277/408 |

* cited by examiner

SHAFT-SEAL DEVICE FOR HIGH-TEMPERATURE FLUID

BACKGROUND OF THE INVENTION

1. Field of the Invention

The present invention relates to a shaft-seal device for high-temperature fluid used in rotating machines (for example, a steam compressor, a compressor, a blower, a pump, or a stirrer that is used in a nuclear power generation system, among others) that deals with high-temperature fluid such as high-temperature steam and boiler water.

2. Description of the Related Art

In this type of shaft-seal device, as a sealing means, a mechanical seal is used, in which the sealing performance is provided by the relative rotation effect of the sealing end-faces that are the facing end-faces of a rotational sealing ring fixed to a rotary shaft, and a stationary sealing ring held to a seal case with an O-ring interposed so as to be movable in the axial direction. Normally, to prevent heat damage of the mechanical seal components, it is devised so that the components, such as the sealing ring, are cooled by setting up a water jacket or a flushing path in the seal case (for example, see Patent Documents 1-3).

[Patent Document 1] Japanese Patent Application Laid-Open (Kokai) No. 2001-349443
[Patent Document 2] WO 2008/132958
[Patent Document 3] WO 2008/142945

However, the reality is that the mechanical seal members, to which the high-temperature fluid that is the sealed fluid comes in contact directly, cannot be cooled sufficiently by the cooling means described above, causing various troubles. Such mechanical seals members include an O-ring used as a sealing ring serving as a secondary seal between the seal case and the stationary sealing ring, and an O-ring for the case, interposed between the seal case and the housings of the rotating apparatus installed to this seal case. For example, when high-temperature fluid comes in contact with an O-ring used as a sealing ring, there is a danger that the O-ring deteriorates even if it is constituted of a heat resistance material such as fluorocarbon resin, the secondary seal function and the suppleness of the stationary scaling ring deteriorate, and the mechanical seal function decreases and becomes lost.

BRIEF SUMMARY OF THE INVENTION

The present invention is made in view of the facts described above, and an object of the present invention is to provide a shaft-seal device for high-temperature fluid in which the mechanical seal components can be cooled effectively, so that good mechanical seal function can be provided, even in a rotating machine that works with a high-temperature fluid.

Firstly, a first aspect of the present invention provides a shaft-seal device for high-temperature fluid in which a mechanical seal is provided in a seal case installed in an apparatus housing so that the mechanical seal exhibits a sealing performance through a relative rotation effect between sealing end-faces that are facing end-faces of:

rotational sealing rings fixed to a rotary shaft passing through said seal case, and
stationary sealing rings fit and held in said seal case with O-rings in between and facing said rotational sealing ring in a displaceable manner in an axis direction of said rotary shaft, and
the shaft-seal device according to the first aspect of the present invention is characterized in that
the seal case takes a metal structure comprising
a main body portion that is a thick-walled cylindrical body,
a first holding portion that is a thin-walled cylindrical body extending from an inner-circumference edge portion of an end portion of the main body portion toward an intra-apparatus housing region direction as a single unit,
a second holding portion that is a thin-walled annular plate extending from an end portion of the first holding portion in a radial direction inwardly as a single unit,
a first partition portion that is a thin-walled annular plate extending from an inner-circumference end portion of the second holding portion in a radial direction inwardly as a single unit,
a channel formation portion that is a thin-walled cylindrical body extending from an inner-circumference end portion of the first partition portion in an intra-apparatus housing region direction as a single unit and forms a minute annular channel between an outer circumference surface of the rotary shaft,
a second partition portion that is a thin-walled annular plate extending from an end portion of the channel formation portion toward a radial direction outwardly as a single unit, and
an O-ring holding portion that is a thin-walled annular plate extending from an outer-circumference end portion of the second partition portion in a radial direction outwardly as a single unit and has an outside diameter coincide with the main body portions, and wherein
the seal case is fitted in the apparatus housing in a state in which first and second O-rings are interposed between inner- and outer-circumference edge portions of the O-ring holding portion and a sealing member of the apparatus housing,
a cooling chamber is provided as an indentation formed between the main body portion and the O-ring holding portion and closed by a feed and discharge path formation portion set up in the apparatus housing,
a coolant is supplied to and discharged from the cooling chamber through feed/discharge coolant paths formed in the feed and discharge path formation portion, and
an intra-seal case region, in which the sealing rings are provided, and a high-temperature fluid region, which is an intra-apparatus housing region, are partitioned by a cooling chamber section that is an inner-circumference section of the cooling chamber and surrounded by both partitioned sections and the channel formation portion.

Also, secondly, a second aspect of the present invention provides a shaft-seal device for high-temperature fluid in which a primary seal, a secondary seal, and a tertiary seal disposed at equal intervals form a mechanical seal in a seal case installed in an apparatus housing so that the mechanical seal exhibits a sealing performance through a relative rotation effect between sealing end-faces that are facing end-faces of:
rotational sealing rings fixed to a rotary shaft passing through the seal case, and
stationary sealing rings fit and held in the seal case with O-rings in between and facing the rotational sealing rings in a displaceable manner in an axis direction of the rotary shaft, and
seal water whose pressure is lower than a fluid pressure of an intra-apparatus housing region is circulated and supplied to each of a first sealed space formed between the primary seal and the secondary seal and a second sealed space formed between the secondary seal and the tertiary seal, and
the shaft-seal device according to the second aspect of the present invention is characterized, in that the seal case takes a metal structure comprising
- a main body portion that is a thick-walled cylindrical body,
- a first holding portion that is a thin-walled cylindrical body extending from an inner-circumference edge portion of an end portion of the main body portion toward an intra-apparatus housing region direction as a single unit,
- a second holding portion that is a thin-walled annular plate extending from an end portion of the first holding portion in a radial direction inwardly as a single unit,
- a first partition portion that is a thin-walled annular plate extending from an inner-circumference end portion of the second holding portion in a radial direction inwardly as a single unit,
- a channel formation portion that is a thin-walled cylindrical body extending from an inner-circumference end portion of the first partition portion in an intra-apparatus housing region direction as a single unit and forms a minute annular channel between an outer circumference surface of the rotary shaft,
- a second partition portion that is a thin-walled annular plate extending from an end portion of the channel formation portion toward a radial direction outwardly as a single unit, and
- an O-ring holding portion that is a thin-walled annular plate extending from an outer-circumference end portion of the second partition portion in a radial direction outwardly as a single unit and has an outside diameter coincide with the main body portions; wherein
- the seal case is fitted in the apparatus housing in a state in which first and second O-rings are interposed between inner- and outer-circumference edge portions of the O-ring holding portion and a sealing member of the apparatus housing,
- a cooling chamber is provided as an indentation formed between the main body portion and the O-ring holding portion and closed by a feed and discharge path formation portion set up in the apparatus housing,
- a coolant is supplied to and discharged from the cooling chamber through feed/discharge coolant paths formed in the feed and discharge path formation portion, and
- an intra-seal case region, in which the sealing rings are provided, and a high-temperature fluid region, which is an intra-apparatus housing region, are partitioned by a cooling chamber section that is an inner-circumference section of the cooling chamber and surrounded by both partitioned sections and the channel formation portion, and the shaft-seal device further comprises a first water feed/discharge means for circulating and supplying the seal water to the first sealed space and a second water feed/discharge means for circulating and supplying the seal water to the second sealed space, each of which being comprised of
- a feed water path formed in the main body portion of the seal case,
- a discharge water path formed in the main body portion,
- an annular feed water channel formed in an inner-circumference surface of the main body portion and communicating with the feed water path,
- an annular discharge water channel formed on an inner-circumference surface of the main body portion and communicating with the discharge water path,
- a shower ring installed in an inner-circumference surface of the main body portion to close and seal openings of the feed/discharge water channels,
- feed water holes that are multiple through-holes communicating with a feed water channel and provided in the shower ring at equal intervals in a circumferential direction thereof, and
- discharge water holes that are multiple through-holes communicating with the discharge water channel and provided in the shower ring at equal intervals in a circumference direction thereof; and each of the first and second water feed/discharge suppresses a pulsing phenomenon of the seal water accompanying a supply and circulation in the sealed space by
- supplying the seal water supplied from the feed water path to the feed water channel to all feed water holes in the sealed space, and
- discharging the seal water in the sealed space from all discharge water holes to the discharge water path through the discharge water channel.

Concerning the second water feed/discharge means in a preferred embodiment of the shaft-seal device of the second aspect of the present invention, in the second water feed/discharge means, the feed water holes are provided facing an outer-circumference surface of the rotational sealing ring in the tertiary seal, and the discharge water hole is provided facing an outer-circumference surface of the stationary sealing ring in the tertiary seal. Instead, in the second water feed/discharge means, the feed water holes can be provided facing an outer-circumference surface of the stationary sealing ring in the tertiary seal, and the discharge water holes can be provided facing an outer-circumference surface of the rotational sealing ring in the tertiary seal.

In either structure of the second water feed/discharge means, it is preferable that in the second water feed/discharge means,
- the feed water path be comprised of an annular feed water header chamber that communicates with a feed water line, and multiple feed water connection channels that are provided at equal intervals along a circumferential direction so that they communicate the feed water header chamber with the feed water channel closed by the shower ring, and
- the discharge water path be comprised of an annular discharge water header chamber that communicates with a discharge water line, and multiple discharge water connection channels that are provided at equal intervals along a circumferential direction so that they communicate the discharge water header chamber with the discharge water channel closed by the shower ring.

When such multiple feed water connection channels are provided in the second water feed/discharge means, it is preferable that the feed water connection channels and the discharge water connection channels be provided to cross each other in an X shape in terms of a cross section passing through an axis line of the rotary shaft.

Also, in the shaft-seal devices of the first and second aspects of the present invention and in particular in the shaft device of the second aspect of the present invention, it is preferable that
- part of the rotary shaft in the seal case be comprised of a shaft main body and sleeves provided on the shaft main body,
- the feed and discharge path formation portion be a cylindrical body that holds therein the seal case in a surrounding state, one of the sleeves be provided on the rotary shaft by using a removable set catch that connects as a unit the sleeve, on which a rotating side element including the rotational sealing rings is installed, and the seal case, on which a stationary side element including the stationary sealing ring is installed, and the seal case be installed in the apparatus housing by
fitting the seal case to the feed and discharge path formation portion to be held, and
engaging an annular ring divided in a circumferential direction that is installed at an end portion of the seal case with annular indentation formed in an inner-circumference end portion of the feed and discharge path formation portion.

Furthermore, in the shaft-seal devices of the first and second aspects of the present invention, it is preferable that multiple metal reinforcement rods be provided at equal intervals in the circumferential direction are welded between facing end-faces of the main body portion and the O-ring holding portion of the seal case. Also, it is preferable that a large number of protruding fins be provided as a unit or integrally in the first holding portion and the inner-circumference surface of the O-ring holding portion of the seal case.

In the shaft-seal devices according to the present invention, the region in the seal case in which the sealing ring of a mechanical seal (in the shaft-seal device of the second aspect of the present invention, the primary seal) is provided and the high-temperature fluid region that is an intra-apparatus housing region, are partitioned by a cooling chamber. Also the seal case sections that form the outer wall of this cooling chamber (the first and second holding portions, the first and second partition portions, the channel formation portion, and the O-ring holding portion) are thin-walled cylindrical bodies or thin-walled annular plates. Because of this, the mechanical seal components provided in the intra-seal case region are cooled effectively by the coolant in the cooling chamber.

Moreover, the inner-circumference section of the cooling chamber is close to the rotary shaft, and the intra-seal case region and the intra-apparatus housing region are communicated through a minute annular channel formed between the opposing surfaces of the channel formation portion and the rotary shaft of the seal case. Because of this, the high-temperature fluid in the apparatus housing is cooled effectively by the coolant in the cooling chamber while passing through the annular channel (and furthermore, by the pressure drop caused by passing through said annular channel occurring), and the fluid temperature in the intra-seal case region becomes much lower in comparison with the temperature inside the apparatus housing. Therefore, even the mechanical seal members that come into a direct contact with the fluid in the apparatus housing (such as the O-rings interposed between the stationary sealing ring and the seal case) are not exposed to a high temperature, and heat degradation and heat loss are prevented.

Also, the seal case is installed in the apparatus housing, between the inner and outer circumference end portions of the O-ring holding portion and the sealing member of the apparatus housing, with the first and the second O-rings interposed in between. Because of that, even if the O-ring of the inner-circumference end portion side of the holding portion (the first O-ring) deteriorates and becomes heat-damaged by coming in contact with the high-temperature fluid, the high-temperature fluid that leaked out from said first O-ring passes between the O-ring holding portion that is a thin wall outer wall of the cooling chamber and the sealing member of the apparatus housing, and becomes sufficiently cooled before reaching the second O-ring. Therefore, the interval between the seal case and the apparatus housing becomes reliably sealed by the second O-ring.

For these reasons, the shaft-seal device according to the present invention provides an extremely good mechanical sealing function to rotating machines treating high-temperature fluid.

Now, when a pair of end-face contact type mechanical seals are disposed parallel in a seal case, and a double seal is formed to supply and circulate a sealing liquid to a sealed space formed between both mechanical seals by a feed/discharge liquid path formed in a seal case (see, for example, Japanese Utility Model Application Laid-Open (Kokai) No. S63-119969), this double seal can form a satisfactory seal through the sealed space, by supplying to the sealed space a sealing liquid of pressure higher than the fluid pressure of the intra-apparatus housing region, even when the fluid in the intra-apparatus housing region is a high pressure fluid. Furthermore, in an end-face contact type mechanical seal, a satisfactory sealing performance can be provided even when the rotary shaft rotates at high speed, by lubricating the relative rotational contact portions of the sealing rings by the confining liquid, and suppressing heating of said relative rotational contact portion by the flushing effect of the sealing liquid. However, because each of the feed liquid path and the discharge liquid path is opened to a single location of the seal case inner-circumference portion, in other words, because the sealing liquid is supplied to the sealed space by a supply liquid port installed at a single location of the seal case inner-circumference portion, and the sealing liquid in the sealed space is discharged by a discharge liquid port installed at a single location of the seal case inner-circumference portion, the following problem occurred when the rotary shaft was rotated a high speed. Rotation-side elements such as a rotational sealing ring of an end-face contact type mechanical seal is installed in the rotary shaft, but high-speed rotation of the rotation-side elements side can cause pumping or conveyance of the sealing liquid around the rotational sealing ring as the rotation-side element rotates in the sealed space; as a result, when the sealing liquid inside the sealed space flows into the discharge liquid port which is provided at a single location, a violent pulsing of the sealing liquid inside the sealed space occurs. Then, when this pulsing occurs, the rotary shaft and the rotation-side elements mounted on it vibrate, and eventually the rotation apparatus as a whole would vibrate, causing major problems such as decrease in the seal performance by the shaft-seal device. The occurrence of the problems caused by this sort of pulsing becomes particularly pronounced more when the rotary shaft rotates at rotational speed higher than or equal to 20 m/s.

The shaft-seal device of the present invention solves such a problem and it is also suitable as a high speed rotating device. More specifically, in the shaft-seal device according to the second aspect of the present invention, because the seal water is circulated to the sealed space by means of multiple water feed/discharge holes provided at equal intervals in the circumference direction, there is little danger that pulsing phenomenon of the seal water occurs in the sealed space, even when the pumping and conveyance described above do occur by the high-speed rotation of the rotary shaft. Therefore, vibration due to pulsation does not occur, and a satisfactory sealing performance is provided even under a rapid rotation condition. Moreover, flushing by the seal water can be done more effectively by making the seal water spout from the multiple discharge water holes, and combined with the pulsation prevention effect of the seal water described above, even more satisfactory sealing performance under a rapid rotation can be obtained.

DETAILED DESCRIPTION OF THE INVENTION

Figure 1:
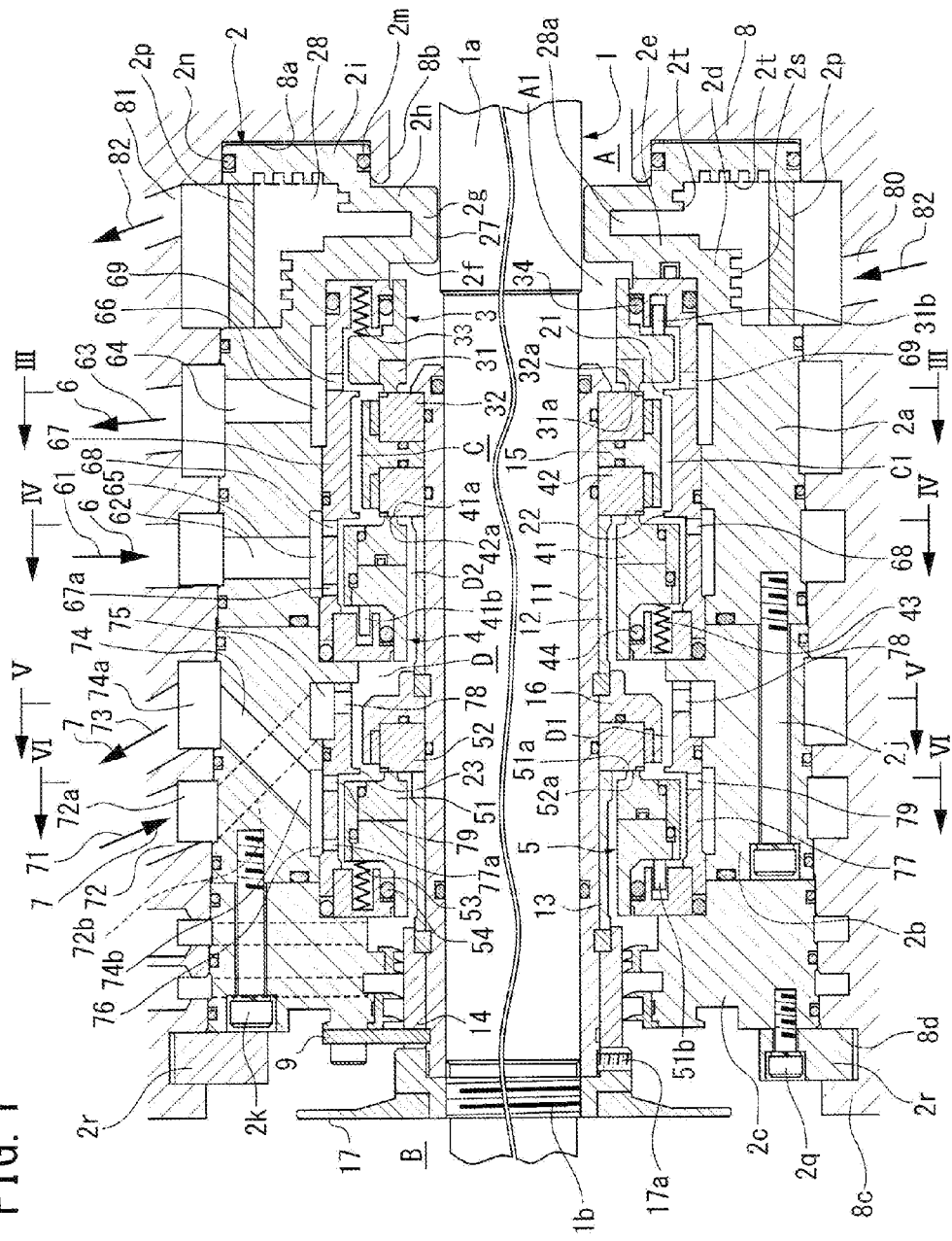
FIG. 1 is a vertical cross-sectional side view showing an embodiment of the shaft-seal device for high temperature fluid according to the present invention.
Figure 2:
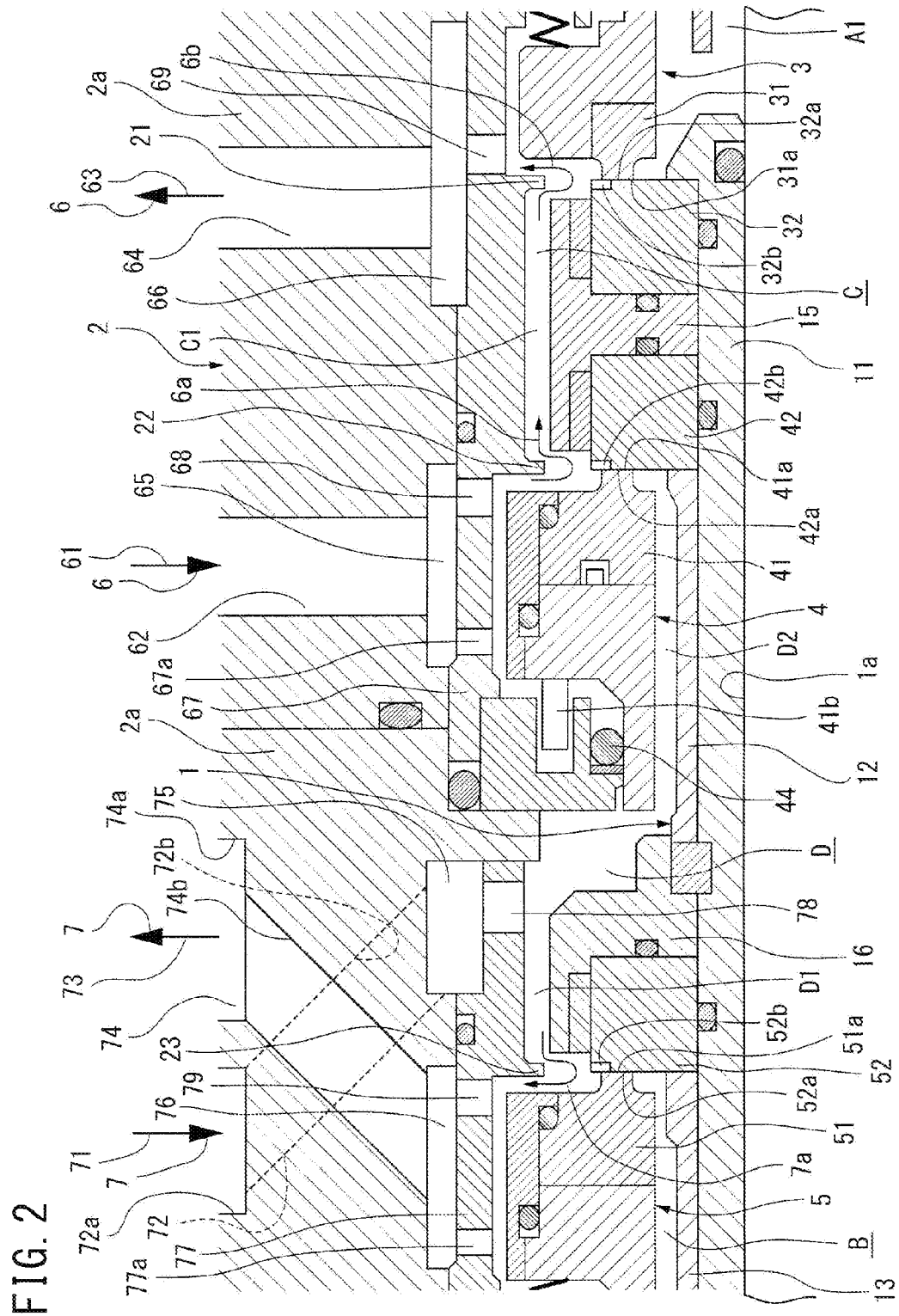
FIG. 2 is a detailed and enlarged view of the essential portion of FIG. 1.
Figure 3:
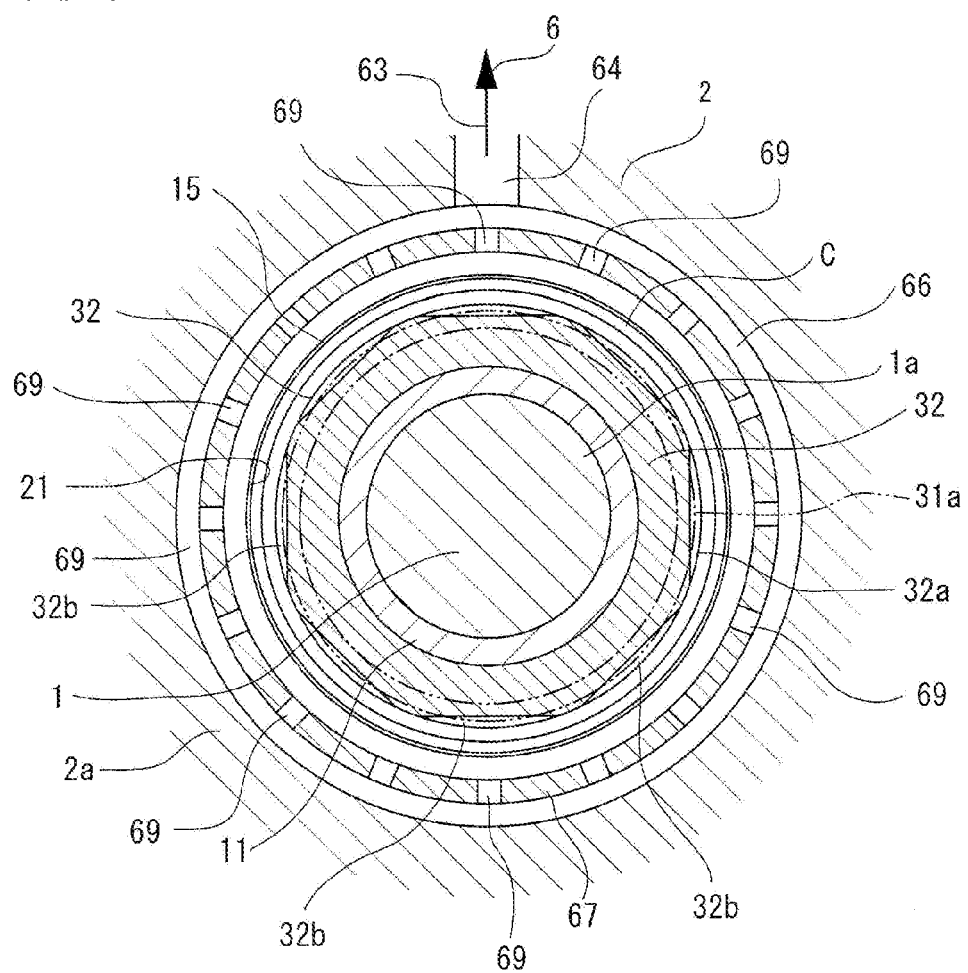
FIG. 3 is a front vertical cross-sectional view taken along the III-III line of FIG. 1.
Figure 4:
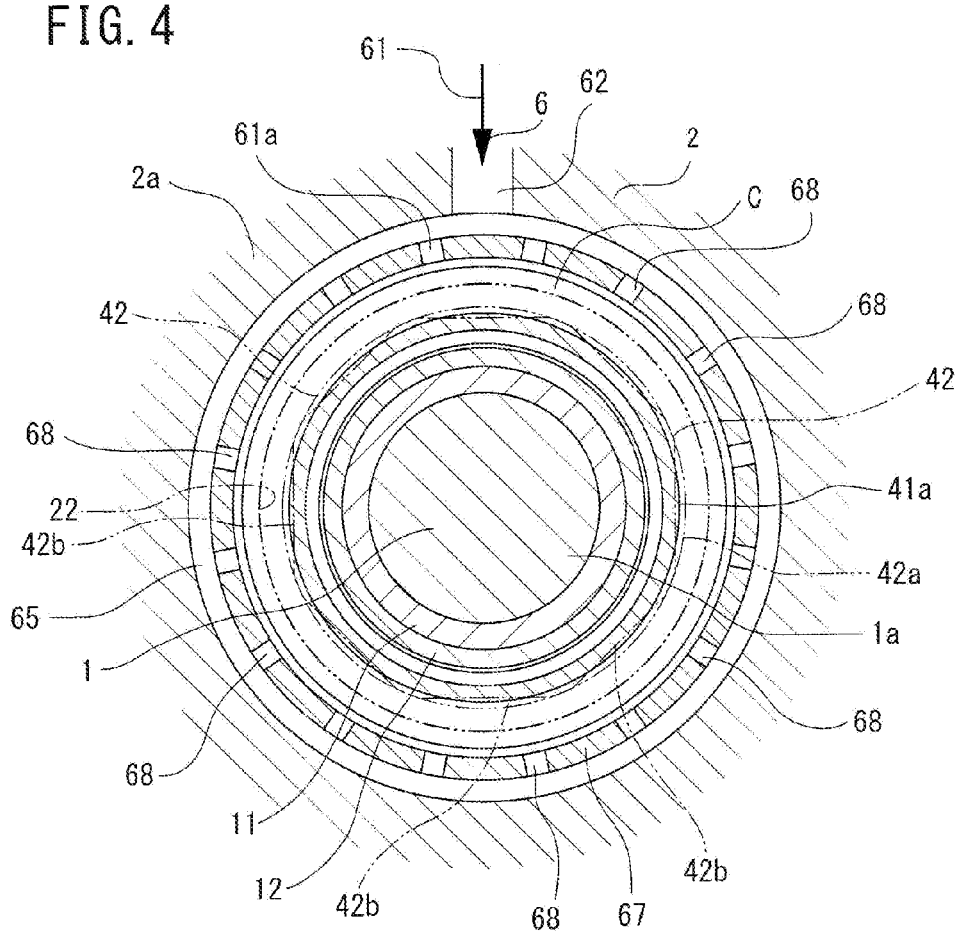
FIG. 4 is a front vertical cross-sectional view taken along the IV-IV line of FIG. 1.
Figure 5:
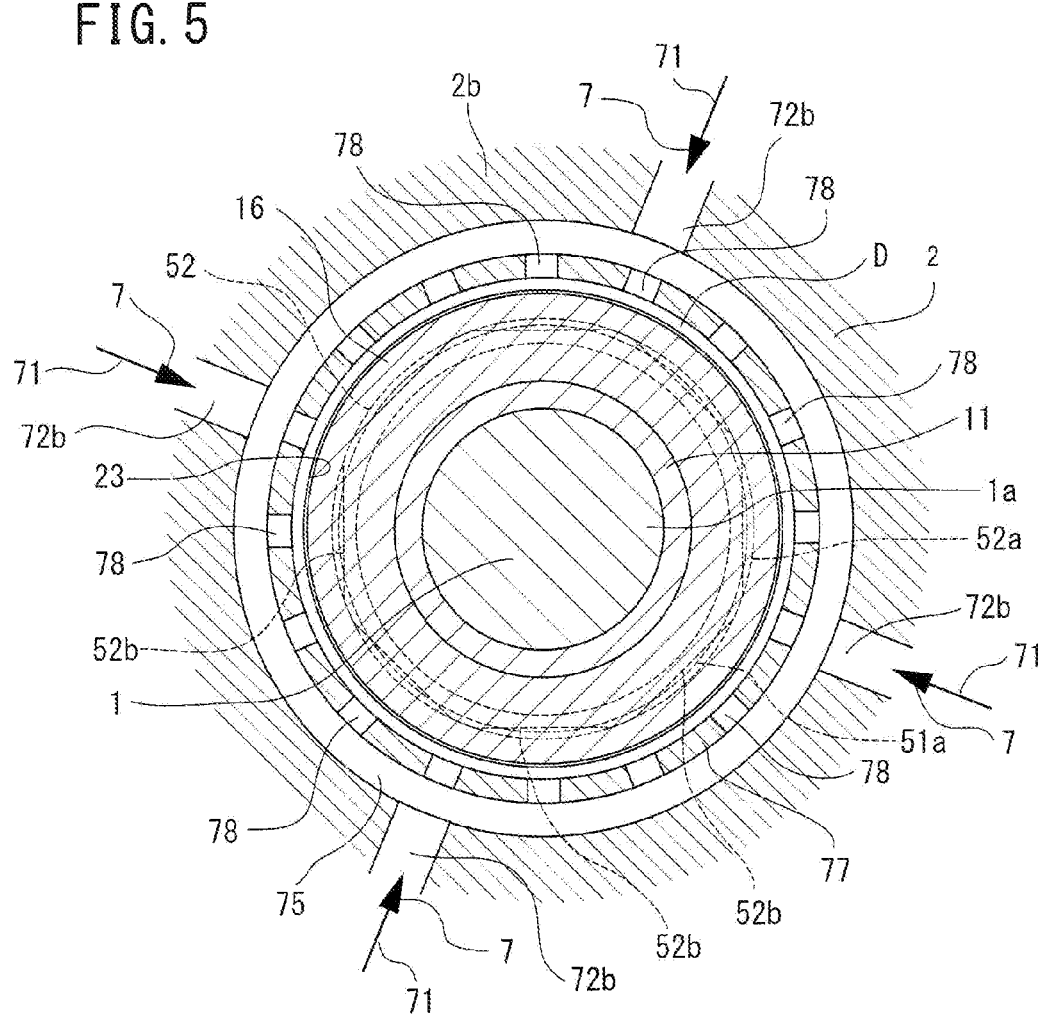
FIG. 5 is a front vertical cross-sectional view taken along the V-V line of FIG. 1.
Figure 6:
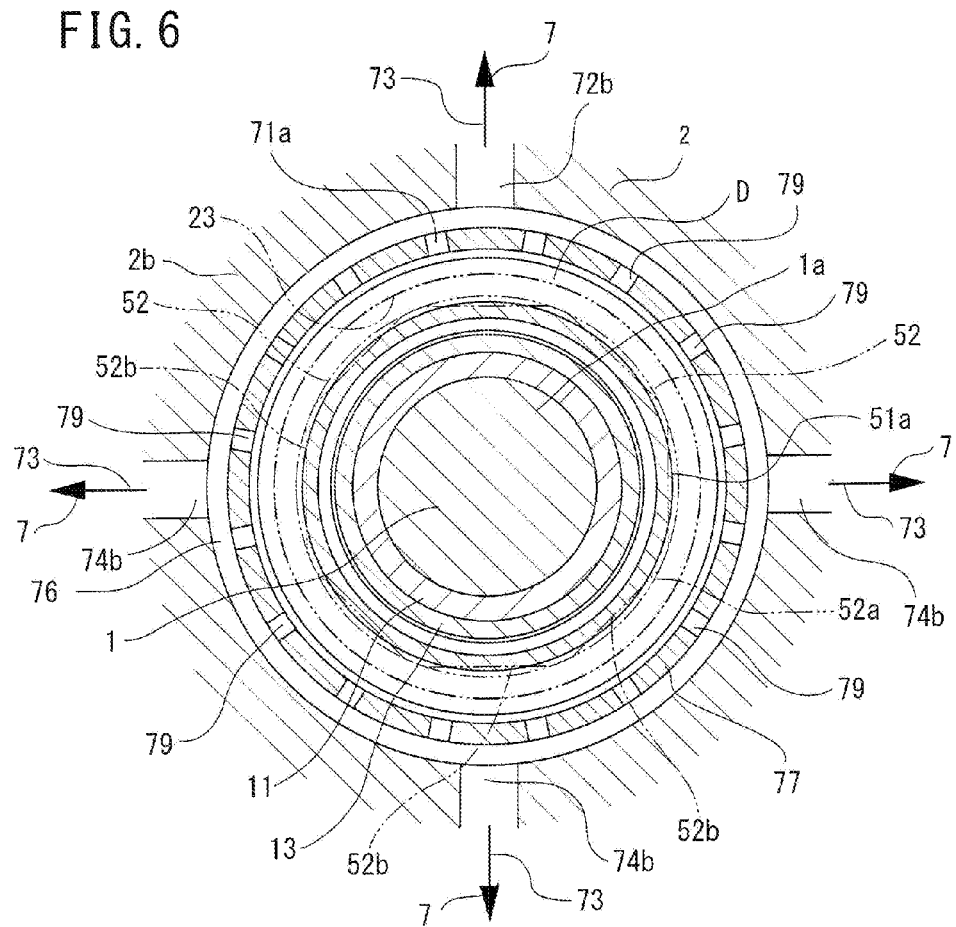
FIG. 6 is a front vertical cross-sectional view taken along the VI-VI line of FIG. 1

FIG. 1 is a vertically-sectioned side view showing an embodiment of the shaft-seal device for high temperature fluid according to the present invention, FIG. 2 is a detailed and enlarged view of its essential portion, FIG. 3 is a front vertical cross-sectional view along the III-III line of FIG. 1, FIG. 4 is a front vertical cross-sectional view along the IV-IV line of FIG. 1, FIG. 5 is a front vertical cross-sectional view along the V-V line of FIG. 1, and FIG. 6 is a front vertical cross-sectional view along the VI-VI line of FIG. 1.

The shaft-seal device for high-temperature fluid shown in FIG. 1 is a rotation apparatus that handles treating high-temperature fluid (for example, high-temperature gas of high pressure) and, especially, it is a shaft-seal device of the second aspect of the present invention which is compatible with a high PV value that is used in a rotation apparatus (such as vapor compressors used in nuclear electricity generation systems) in which the rotary shaft rotates at high speed (for example, the circumferential velocity of the rotary shaft is 20 m/s or higher).

This shaft-seal device for high-temperature fluid, as shown in FIG. 1, is comprised of a first mechanical seal 3 that is the primary seal, a second mechanical seal 4 that is the secondary seal, and a third mechanical seal that is the tertiary seal, and these seals are disposed in the axial direction of a rotary shaft 1 in such a manner that they are between the rotary shaft 1 and a seal case 2 that surrounds the rotary shaft 1. This seal device seals the space between an intra-mechanical region (intra-apparatus housing region) A, which is a region inside the housing (apparatus housing) of the above-described rotation apparatus in which the seal case 2 is installed, and the atmosphere region B, which is an extra-mechanical region, by means of a sealed space C formed between the first mechanical seal 3 and the second mechanical seal 4 (hereafter, called the "first sealed space") and by a sealed space D formed between the second mechanical seal 4 and the third mechanical seal 5 (hereafter, called the "second sealed space"). In other words, the first mechanical seal 3 is a primary seal that seals between the intra-apparatus region A and the first sealed space C; the second mechanical seal 4 is a secondary seal that seals between the first sealed space C and the second sealed space D; and the third mechanical seal 5 is a tertiary seal that seals between the second sealed space D and the atmosphere region B. In the following description, the pressure force is a gauge-pressure.

The rotary shaft 1, as shown in FIG. 1, protrudes from a sealing member 8a that is an end portion of the apparatus housing 8 toward the direction outside of the apparatus, and penetrates through the seal case 2 concentrically. In the rotary shaft section inside the seal case 2, the rotary shaft 1 takers a layered structure in which cylindrical sleeves 11, 12, 13 and 14 are fitted to the shaft main body 1a of the rotary shaft 1. The sleeves 12, 13 and 14 are fitted on the long sleeve 11. Also, the sealing member 8a of the apparatus housing 8, protruding from its inner circumference, has an annular projection 8b. In addition, continuing from its outer circumference and protruding in the axis line direction of the rotary shaft 1 (subsequently referred to as "axial direction"), a feed and discharge path formation portion 8c is installed. The feed and discharge path formation portion 8c is a cylindrical body slightly longer than the seal case 2 described below, and it has a circular inner-circumference surface to which the seal case 2 can be fitted in so as to surround it.

The seal case 2, as shown in FIG. 1, takes a metal structure comprising main body portions 2a, 2b and 2c that are each thick-walled cylindrical bodies, a first holding portion 2d that is a thin-walled cylindrical body, extending from the inner-circumference edge portion of an end portion of the main body portions 2a, 2b and 2c toward the intra-apparatus housing region A as a single unit or integrally, a second holding portion 2c that is a thin-walled annular plate, extending from an end portion of the first holding portion 2d toward the radial direction inwardly as a single unit, a first partition portion 2f that is a thin-walled annular plate, extending from an inner-circumference end portion of said second holding portion 2e toward a radial direction inwardly as a single unit, a channel formation portion 2g that is a thin-walled cylindrical body extending from an inner-circumference end portion of the first partition portion 2f toward the intra-apparatus housing region A as a single unit, a second partition portion 2h that is a thin-walled annular plate, extending from the end portion of the channel formation portion 2g in a radial direction outwardly as a single unit, and an O-ring holding portion 2i whose outside diameter coincides with the main body portions 2a, 2b and 2c, being a thin-walled annular plate extending from the outer-circumference end portion of the second partition portion 2h in a radial direction outwardly as a single unit.

The main body portion, as shown in FIG. 1, takes a metal cylindrical structure of constant diameter, which is divided into three portions in the axis line direction, comprising a first main body portion 2a that connects the first holding portion 2d as a single unit, a second main body portion 2b to which this first main body portion 2a is connected by bolts 2j of a given number, and a third main body portion 2c to which this second main body portion 2b is connected by bolts 2k of a given number. The first main body portion 2a is formed as a single unit with the first holding portion 2d, the second holding portion 2e, the first partition portion 2f, the channel formation portion 2g, the second partition portion 2h and the O-ring holding portion 2i.

The first holding portion 2*d*, the second holding portion 2*e*, the first partition portion 2*f*, the channel formation portion 2*g*, the second partition portion 2*h*, and the O-ring holding portion 2*i* are formed so that their wall thickness is thinner compared to the wall thickness (thickness toward the radial direction) of the main body portions 2*a*, 2*b* and 2*c*. The channel formation portion 2*g* extends toward the axial direction, in proximity to the outer circumferential surface of the rotary shaft 1, that is to say, the shaft main body 1*a*, and it forms a minute annular channel 27 between the opposing surfaces with the shaft main body 1*a*. The O-ring holding portion 2*i* has O-ring grooves formed in its inner and outer circumference end portions, and a first O-ring 2*m* and a second O-ring 2*n* are engaged with these O-ring grooves. Its outer diameter coincides with that of the main body portions 2*a*, 2*b* and 2*c*. Between the opposing surfaces of the first main body portion 2*a* and the O-ring holding portion 2*c*, multiple metal reinforcement rods (for example, round metal bars) 2*p* are welded at equal intervals in the circumferential direction. By means of these rods, the thin-walled structure formed by the first holding portion 2*d*, the second holding portion 2*e*, the first partition portion 2*f*, the channel formation portion 2*g*, the second partition portion 2*h*, and the O-ring holding portion 2*i* is reinforced so that it does not deform.

The seal case 2, as shown in FIG. 1, is installed in the apparatus housing 8 so that the first and second O-rings 2*m* and 2*n* are interposed between the sealing member 8*a* of the apparatus housing 8 and the O-ring holding portions 2*i*. More specifically, the seal case 2 is provided in the apparatus housing 8 so that the O-ring holding portion 2*i* is engaged with the annular indentation formed by the sealing member 8*a*, the annular projection 8*b*, and the feed and discharge path formation portion 8*c* of the apparatus housing 8: In other words, it is fit in the feed and discharge path formation portion 8*c* and thus installed in the apparatus housing 8 in such manner that the gap between the sealing member 8*a* is sealed by the first O-ring 2*m* at the inner circumference side of the O-ring holding portion 2*i* and the second O-ring 2*n* at the outer circumference side, and furthermore, an annular ring 2*r* installed at its end portion (an end portion of the third main body portion 2*c*) by bolt 2*q* is engaged with an annular indentation 8*d* formed in the end portion inner circumference of the feed and discharge path formation portion 8*c*. In addition, the annular ring 2*r* is divided into multiple sections in the circumferential direction, and it forms into an annular body when all the divided sections are set in the annular indentation 8*d* and attached to the third main body portion 2*c*.

In the seal case 2, an annular indentation is formed between its main body portion (the first main body portion 2*a*) and the O-ring holding portion 2*i*. This annular indentation is formed into a cooling chamber 28 closed by the feed and discharge path formation portion 8*c*, when the seal case 2 is installed in the apparatus housing 8. A cooling chamber section 28*a* is an inner-circumferential section of the cooling chamber 28 and is formed so that it is surrounded by both partition portions 2*f*, 2*h* and the channel formation portion 2*g*, and it partitions the sealed fluid region between the intra-seal case region A1, in which the sealing rings 31 and 32 of the mechanical seal 3 are provided, and the intra-apparatus region A, which is the high-temperature fluid region. These regions A and A1 are communicated only through a minute annular channel 27. To the cooling chamber 28, coolant 82 is supplied and discharged by feed/discharge coolant paths 80 and 81 formed in the feed and discharge path formation portion 8*c*. More specifically, by the coolant 82 supplied to the cooling chamber 28 from the feed coolant path 80, the metal thin-walled portion (the first holding portion 2*d*, the second holding portion 2*e*, the first partition portion 2*f*, the channel formation portion 2*g*, the second partition portion 2*h*, and the O-ring holding portion 2*i*) forming the outer wall of the cooling chamber 28 is cooled, accomplishing heat exchange (cooling) between the fluid and members in contact with the metal thin-walled portion. It is designed so that the coolant 82 may circulate from the discharge coolant path 81 to the feed coolant path 80. In the inner-circumference surface of the first holding portion 2*d* and the O-ring holding portion 2*i*, as shown in FIG. 1, a large number of protruding fins 2*s* and 2*t* are formed as a unit or integrally, and they are devised so that the cooling of the members and the fluid coming in contact with both portions 2*d* and 2*i* becomes even more efficient. Water is used as the coolant 82, and a cooling device such as a heat exchanger is arranged in its circulation pathway whenever necessary.

The first mechanical seal 3, as shown in FIG. 1, comprises a stationary sealing ring 31 (hereinafter, called the "first stationary sealing ring") that is held by the seal case 2 so as to be movable in its axial direction, a rotational sealing ring 32 (hereinafter, called the "first rotational sealing ring") that is fixed to the rotary shaft 1 and facing the first stationary sealing ring, and a spring member 33, which presses the first stationary sealing ring 31 against the first rotational sealing ring 32. The first mechanical seal 3 is an end-face contact-type mechanical seal that, by means of the relative rotational contact action of the sealing end-faces 31*a* and 32*a* which are the end-faces of the two sealing rings 31 and 32 that face each other, seals the space between the intra-mechanical region A, which is the region on the inner-circumference side of the relative rotational contact portions, and the sealed space C (hereinafter, called the "first sealed space"), which is the region at their outer circumference.

The third mechanical seal 5, as shown in FIG. 1, comprises a stationary sealing ring 51 (hereinafter, called the "third stationary sealing ring") that is held by the seal case 2 so as to be movable in its axial direction, a rotational sealing ring 52 (hereinafter, called the "third rotational sealing ring") that is fixed to the rotary shaft 1 and facing the third stationary sealing ring, and a spring member 53 that presses the third stationary sealing ring 51 against the third rotational sealing ring 52. The third mechanical seal 5 is an end-face contact-type mechanical seal that, by means of the relative rotational contact action of the sealing end-faces 51*a* and 52*a* which are the end-faces of the two sealing rings 51 and 52 that face each other, seals the space between the atmosphere region B, which is the region on the inner-circumference side of the relative rotational contact portions, and the second sealed space D, which is the region at their outer circumference.

The second mechanical seal 4 is, as shown in FIG. 1, disposed between the first mechanical seal 3 and the second mechanical seal 5. This second mechanical seal 4 is comprised of a stationary sealing ring 41 (hereinafter, called the "second stationary sealing ring") that is held by the seal case 2 so as to be movable in its axial direction, a rotational sealing ring 42 (hereinafter, called the "second rotational sealing ring") that is fixed to the rotary shaft 1 and facing the second stationary sealing ring 41, and a spring member 43 that presses the second stationary sealing ring 41 against the second rotational sealing ring 42. The second mechanical seal 4 is an end-face contact-type mechanical seal that, by means of the relative rotational contact action of the sealing end-faces 41*a* and 42*a* which are the end-faces of the two sealing rings 41 and 42 that face each other, seals the space between the first sealed space C (the sealed fluid region in the secondary seal), which is the region on the outer-circumference side of the relative rotational contact portions, and the second sealed space D, which is the region at the inner circumference.

The first mechanical seal 3 and the second mechanical seal 4 constitute a double seal structure in which the sealing ring disposition (location) in the axial direction is opposite from each other. The second mechanical seal 4 and the third mechanical seal 5 constitute a tandem seal (tandem double seal structure) and the sealing ring disposition in the axial direction is identical. The first and second rotational sealing rings 32 and 42 are fixed to the rotary shaft 1 by means of sleeves 11 and 12 and holding ring 15 with their base end-faces facing each other. The first and second stationary sealing rings 31 and 41 are fitted in and held by the seal case 2 such that they are movable in the axial direction via the respective O-rings 34 and 44, and their front end-faces (sealing end-faces) 31a and 41a face each other with the rotational sealing rings 32 and 42 in between. The sealing rings 51 and 52 of the third mechanical seal 5 are disposed on the atmosphere region B side of the second mechanical seal 4 such that their orientation is the same as the sealing rings 41 and 42 of the second mechanical seal 4 (tandem disposition). The third rotational sealing ring 52 is fixed to the rotating shaft 1 by means of sleeves 11 and 13 and holding ring 16, and the third stationary sealing ring 51 is inserted into and held by the seal case 2 by means of an O-ring 54 so as to be movable in its axial direction.

The stationary sealing rings 31, 41 and 51 of the respective first, second and third mechanical seal 3, 4 and 5 are, as shown in FIGS. 1 and 2, ring-shaped bodies fitted and held in place via O-rings 34, 44 and 54, respectively, in spring retainer portions formed in the inner-circumference part of the seal case 2 such that they can move in the axial direction; and their front end-faces form sealing end-faces 31a, 41a and 51a, which are flat, smooth ring-shaped surfaces orthogonal to the axis line of the rotary shaft 1. The stationary sealing rings 31, 41 and 51 are prevented from rotating relative to the seal case 2, though allowed to make an axis line movement within a prescribed range, by their drive pins 31b, 41b and 51b which respectively project out therefrom and engaged with engagement holes formed in the spring retainer portions. The portions (sealing end-face formation portions) where the sealing end-faces 31a, 41a and 51a are formed respectively on the stationary sealing rings 31, 41 and 51 are made of carbon.

The rotational sealing rings 32, 42 and 52 of the respective first, second and third mechanical seal 3, 4 and 5 are, as shown in FIGS. 1 and 2, ring-shaped bodies respectively fixed to the rotating shaft 1 via the sleeves 11, 12, 13 and 14 and holding rings 15 and 16. The front end-faces of the respective rotational sealing rings 32, 42 and 52 make sealing end-faces 32a, 42a and 52a, which are flat, smooth ring-shaped surfaces orthogonal to the axis line of the rotary shaft 1. The outer-circumference surfaces (the outer-circumference surface parts except for the front end parts formed with the sealing end-faces 32a and 42a) of the first and second rotational sealing rings 32 and 42 are respectively covered by the outer-circumference surface of the holding ring 15, and form a seal water flow channel C1 (a cylindrical flow channel that runs parallel to the axial direction) that has no indentations or protrusions in the space between the facing circumferential surfaces of the two rotational sealing rings 32 and 42 and the inner-circumference part of seal case 2 (shower ring 67, which will be described later). The outer-circumference surface (the outer-circumference surface parts except for the front end part formed with sealing end-face 52a) and the rear surface (base end-face) of the third rotational sealing ring 52 are covered by the holding ring 16, and form a seal water flow channel D1 (a cylindrical flow channel that runs parallel to the axial direction) that has no indentations or protrusions in the space between the facing circumferential surfaces of the third rotational sealing ring 52 and the inner-circumference part of the seal case 2 (shower ring 77, which will be described later). The portions that form the sealing end-faces 32a, 42a and 52a of the rotational sealing rings 32, 42 and 52 (sealing end-face forming portions) are made of a ceramic (silicon carbide or the like) or the like that is harder than the sealing end-face forming portions of the stationary sealing rings 31, 41 and 51.

Each one of the spring members 33, 43 and 53 of the respective first, second and third mechanical seal 3, 4 and 5 is, as shown in FIG. 1, formed by a plurality of coil springs loaded between the stationary sealing rings 31, 41 and 51 and the above-described spring retainer portions and separated by a prescribed interval in the circumferential direction. The spring members 33, 43 and 53 are provided to respectively make the stationary sealing rings 31, 41 and 51 press against the rotational sealing rings 32, 42 and 52.

The shaft-seal device for high-temperature fluid, as shown in FIG. 1, has a cartridge structure. In this structure, the long sleeve 11, to which the rotation side elements (such as the sleeves 12, 13 and 14 and the rotational sealing rings 32, 42 and 52) are installed, and the seal case 2, to which stationary side elements (such as the stationary sealing rings 31, 41 and 51) are installed, are connected as a unit by a removable set catch 9, and thus the long sleeve 11 is fit and held to the axis body 1a. Also, the seal case 2 is fit into the feed and discharge path formation portion 8c, and the seal case 2 is installed in the apparatus housing 8 by engaging the annular ring 2r to the annular indentation 8d of the feed and discharge path formation portion 8c and also installing in the seal case 2 (the third main body portion 2c). More specifically, the above-described shaft-seal device for high-temperature fluid is mounted on the apparatus housing 8 by passing the long sleeve 11, to which the rotation side elements are installed, together with the seal case 2, to which the stationary side elements are installed, through the axis body 1a while maintaining the configuration in which they are unified by the set catch 9 (the configuration as they are assembled in the shaft-seal device), and furthermore, screwing a stopper ring 17, which also serves as a sling, to a screw portion 1b formed on the axis body 1a, and fastening this stopper ring 17 to the axis body 1 by a setscrew 17a. Then, after detaching the set catch 9, the operation of the shaft-seal device for high-temperature fluid is started. Also, in maintenance work, the shaft-seal device for high-temperature fluid can be detached from the apparatus housing 8 by an operation sequence reverse from the above. With employment of such a cartridge structure, assembly of the shaft-seal device and mounting to and dismounting from the apparatus housing 8 can be done accurately and easily. Such characteristics become extremely advantageous, especially in a device with a complicated structure, such as the above-described shaft-seal device for high-temperature fluid having multiple mechanical seals 3, 4 and 5.

By a first water feed/discharge means (described below), the first sealed space C is supplied by, to circulate therein, seal water 6 which is at a pressure higher than the fluid pressure of the intra-mechanical region A. In addition, by a second water feed/discharge means (described below), the second sealed space D is supplied by, to circulate therein, seal water 7. The seal water 7 is at a pressure lower than that of the first sealed space C (a sealed fluid region that is sealed by a secondary seal), which is a region at the outer-diameter side of the sealing end-faces 41a and 42a in the second mechanical seal 4 (a mechanical seal on the sealed fluid region side at the secondary seal), and higher than that of the atmosphere region B, which is a region at the inner-diameter side of the sealing end-faces 51a and 52a in the third mechanical seal 5 (an atmosphere region side mechanical seal in the secondary seal). The sealed spaces C and D are kept at prescribed pressures (Intra-mechanical region A pressure<First sealed space C pressure, and Extra-mechanical region B pressure (atmospheric pressure)<Second sealed space D pressure<First sealed space C pressure) and are further designed so that a flushing effect is accomplished in such spaces using the seal water 6 and 7. In addition, as shown in FIGS. 2 through 6, indentations (hydro-cuts) 32b, 42b and 52b that partially cover the outer-circumference edge of the facing sealing end-faces 31a, 41a and 51a (sealing end-faces of the stationary sealing rings 31, 41 and 51) are formed in the outer-circumference edges of the respective sealing end-faces 32a, 42a and 52a of the rotational sealing rings 32, 42 and 52. These indentations (hydro-cuts) 32b, 42b and 52b are for enabling effective lubrication between the sealing end-faces 31a and 32a, 41a and 42a and 51a and 52a by aggressively introducing the seal water 6 between the respective stationary and rotational sealing rings 31 and 32 and 41 and 42 and the seal water 7 between the stationary and rotational sealing rings 51 and 52.

The first water feed/discharge means is, as shown in FIGS. 1 and 2, comprised of a feed water path 62 formed in the seal case 2 and connected to a feed water line 61 that is outside the seal case 2, a discharge water path 64 formed in the seal case 2 and feed and discharge path formation portion 8c of apparatus housing 8 and connected to a discharge water line 63, a ring-shaped feed water channel 65 that is formed in the inner-circumference surface of the seal case 2 and communicates with the feed water path 62, a ring-shaped discharge water channel 66 that is formed in the inner-circumference surface of the seal case 2 and communicates with the discharge water path 64, and a shower ring 67 mounted on the inner-circumference surface of the seal case 2 to close the openings of the feed water channel 65 and discharge water channel 66. The first water feed/discharge means further includes feed water holes 68 and discharge water holes 69. The feed water holes 68 are formed in the shower ring 67 and are a plurality of through-holes provided at equal intervals in the circumferential direction of the shower ring 67 and communicate with the feed water channel 65, and the discharge water holes 69 are also formed in the shower ring 67 and are a plurality of through-holes provided at equal intervals in the circumferential direction of the shower ring 67 and communicate with the discharge water channel 66. With the first water feed/discharge means thus constructed, the seal water 6 supplied from the feed water path 62 to the feed water channel 65 is supplied through all the feed water holes 68 to the first sealed space C while the feed water 6 inside the first sealed space C is discharged to the discharge water path 64 through all the discharge water holes 69 from the discharge water channel 66. The feed water holes 68 are, as shown in FIGS. 1-3, formed in the shower ring 67 such that they form openings that face the sealing end-face 41a which is the outer-circumference surface of the stationary seal ring 41 (second stationary seal ring) of the second mechanical seal 4. The discharge water holes 69 are, as shown in FIGS. 1, 2 and 4, formed in the shower ring 67 such that they form openings that face the sealing end-face 31a which is the outer-circumference surface of the stationary seal ring 31 (second stationary seal ring) of the first mechanical seal 3. Furthermore, the shower ring 67 of the first water feed/discharge means is provided with an appropriate number of air vent holes 67a. The air vent holes 67a are disposed in the shower ring 67 at positions away from the feed water holes 68 toward the atmosphere region B side, and they communicate the first sealed space C with the interior of the feed water channel 65.

The feed/discharge water lines 61 and 63 of the first water feed/discharge means are connected to a seal-water supply device (not shown) equipped with a plunger pump or the like; and the feed/discharge water lines 61 and 63, the feed/discharge water paths 62 and 64, the feed/discharge water channels 65 and 66, the feed/discharge water holes 68 and 69, and the first sealed space C form a circulation line of the seal water 6. In other words, the seal water 6 at constant pressure is supplied from the feed water holes 68 to the first sealed space C at constant flow while the same amount of seal water 6 is discharged from the first sealed space C to the discharge water holes 69, thus making supply and circulation of the seal water 6 into the first sealed space C at constant pressure. Accordingly, the first sealed space C is constantly filled with the seal water 6 and maintained at constant pressure. The pressure and circulation volume of the seal water 6 is set to be somewhat higher (about 0.5 MPaG) in the first sealed space C than in the intra-mechanical region A. For example, when the fluid in the intra-mechanical region A is high-pressure steam at 7.2 MPaG, then the pressure of the seal water 6 is set to 7.7 MPaG and the feed/discharge volume of the seal water 6 (circulation volume) is set at 96 L/min, thus keeping the pressure of the first sealed space C 0.5 MPaG higher than that of the intra-mechanical region A.

The relative rotational contact portions 31a and 32a in the first mechanical seal 3 and the relative rotational contact portions 41a and 42a in the second mechanical seal 4 are flushed by the seal water 6 supplied to and discharged from the first sealed space C. So as to make this flushing with the seal water 6 performed more efficiently, ring-shaped first and second guide projections 21 and 22 are formed in the inner-circumference part of the shower ring 67 so that they are disposed at positions facing the relative rotational contact portions 31a and 32a of the first mechanical seal 3 and at a position facing the relative rotational contact portions 41a and 42a of the second mechanical seal 4 as shown in FIG. 2. The seal water 6 is thus guided toward the relative rotational contact portions 31a and 32a of the first mechanical seal 3 and toward the relative rotational contact portions 41a and 42a of the second mechanical seal 4 when the seal water 6 flows through the seal-water flow channel from the feed water holes 68 to the discharge water holes 69. In other words, the seal water 6 flowing from the feed water holes 68 to the seal water flow path C1 is, in the seal-water flow channel between the feed water holes 68 and the discharge water holes 69, guided toward the relative rotational contact portions 41a and 42a of the second mechanical seal 4 by the second guide projection 22 and becomes reverse flow 6a. On the other hand, the seal water 6 flowing from the seal water flow path C1 to the discharge water holes 69, in the seal-water flow channel between the feed water holes 68 and the discharge water holes 69, is guided toward the relative rotational contact portions 31a and 32a of the first mechanical seal 3 by the first guide projection 21 and becomes reverse flow 6b. Thus, the reverse flows 6a and 6b keep the seal water 6 flowing without stoppage even in the area around the relative rotational contact portions 31a and 32a and 41a and 42a, thus enabling effective flushing of the sealing rings 31, 32, 41 and 42, which include the relative rotational contact portions 31a and 32a and the relative rotational contact portions 41a and 42a.

The second water feed/discharge means is, as shown in FIGS. 1 and 2, comprised of a feed water path 72 formed in the seal case 2 and feed and discharge path formation portion 8c of the apparatus housing 8 and connected to feed water lines 71, a discharge water path 74 formed in the seal case 2 and feed and discharge path formation portion 8c of the apparatus housing 8 and connected to discharge water lines 73 that are outside the seal case 2, a ring-shaped feed water channel 75 which is formed in the inner-circumference surface of the seal case 2 and communicates with the feed water path 72, a ring-shaped discharge water channel 76 that is formed in the inner-circumference surface of the seal case 2 and communicates with the discharge water path 74, a shower ring 77 mounted on the inner-circumference surface of the seal case 2 to close the openings of the feed water channel 75 and discharge water channel 76. The second water feed/discharge means further includes feed water holes 78 and discharge water holes 79. The feed water holes 78 are formed in the shower ring 77 and are a plurality of through-holes provided at equal intervals in the circumferential direction of the shower ring 77 and communicate with the feed water channel 75, and the discharge water holes 79 are also formed in the shower ring 77 and are a plurality of through-holes provided at equal intervals in the circumferential direction of the shower ring 77 and communicate with the discharge water channel 76.

With the second water feed/discharge means thus constructed, the seal water 7 supplied from the feed water path 72 to the feed water channel 75 is supplied through all the feed water holes 78 to the second sealed space D while the feed water 7 inside the second sealed space D is discharged to the discharge water path 74 through all the discharge water holes 79 from the discharge water channel 76.

The feed water holes 78 are, as shown in FIGS. 1, 2 and 5, formed in the shower ring 67 such that they form openings that face the end part of the intra-mechanical region A side of the seal water flow path D1 that is the outer-circumference surface of the rotational sealing ring (third rotational sealing ring) 52 of the third mechanical seal 5, in other words, the interface area between the large diameter part and small diameter part of the holding ring 16 that covers the sealing ring 52. The discharge water holes 79 are, as shown in FIGS. 1, 2 and 6, formed in the shower ring 67 such that they form openings that face the sealing end-face 51a, which is the outer-circumference surface of the stationary seal ring 51 (third stationary seal ring) of third mechanical seal 5.

The feed water path 72 of the second water feed/discharge means, as shown in FIGS. 1, 2 and 5, comprises a ring-shaped feed water header chamber 72a and a plurality of feed water connection channels 72b. The feed water header chamber 72a communicates with the feed water lines 71, and the plurality of feed water connection channels 72b are provided in the circumferential direction separated by equal intervals to communicate the feed water header chamber 72a with the interior of the feed water channel 75 that is closed by the shower ring 77. The thus constructed feed water path 72 supplies the seal water 7, which is supplied from the feed water lines 71 to the feed water header chamber 72a, from the plurality of feed water connection channels 72b to the feed water channel 75.

The discharge water path 74 of the second water feed/discharge means, as shown in FIGS. 1, 2 and 6, comprises a ring-shaped discharge water header chamber 74a and a plurality of discharge connection channels 74b. The discharge water header chamber 74a communicates with the discharge water lines 73, and the plurality of discharge connection channels 74b are provided in the circumferential direction separated by equal intervals to communicate the discharge water header chamber 74a with the interior of the discharge water channel 76 that is closed by the shower ring 77. The thus constructed discharge water path 74 discharges the seal water 7, which is inside the second seal chamber D and flowed from the plurality of discharge water holes 79, to the discharge water lines 73 from the plurality of discharge connection channels 74b via the discharge water header chamber 74a.

The feed water connection channels 72b and the discharge connection channels 74b are oblique channels that are slanted in opposite directions relative to the axis line of the rotary shaft 1. More specifically, as shown in FIGS. 1 and 2, the feed water connection channels 72b and the discharge connection channels 74b are designed so that the axial direction positional relationship of the feed/discharge water header chambers 72a and 74a is a reverse of the axial direction positional relationship of the feed/discharge water channels 75 and 76, and the feed water connection channels 72b and the discharge connection channels 74b cross each other in an X shape when viewed in a direction of cross-section parallel to the axis line of the rotary shaft 1 and crossing along the axis line. The angle of inclination of the connection channels 72b and 74b relative to the axis line of the rotary shaft is set to 45° or roughly 45°. Needless to say, the feed connection channel 72b and the discharge connection channel 74b do not interfere with each other.

The number and shape (cross-sectional area (area of the cross-section orthogonal to the direction of water flow)) of the feed/discharge connection channels 72b and 74b and of the feed/discharge water holes 78 and 79 are set appropriately so that the total cross-sectional area of all the feed/discharge connection channels 72b and 74b is identical to the total cross-sectional area of all the feed/discharge water holes 78 and 79 or somewhat larger than the total cross-sectional area of all the feed/discharge water holes 78 and 79. The shower ring 77 of the second water feed/discharge means is provided with an appropriate number of air vent holes 77a. The air vent holes 77a are disposed in the shower ring 77 at positions away from the discharge water holes 79 toward the atmosphere region B side, and they communicate the second sealed space D with the inside discharge water channel 76.

The feed/discharge water lines 71 and 73 of the second water feed/discharge means are connected to a seal-water supply device (not shown) equipped with plunger pumps or the like, and the feed/discharge water lines 71 and 73, the feed/discharge water paths 72 and 74, the feed/discharge water channels 75 and 76, the feed/discharge water holes 78 and 79, and the second sealed space D form a circulation line of the seal water 7. In other words, the seal water 7 at constant pressure is supplied from the feed water path 72 to the second sealed space D at constant flow rate while the same amount of seal water 7 is discharged from the second sealed space D to the discharge water path 74, thus supplying and circulating the seal water 7 in the second sealed space D at constant pressure. Accordingly, the second sealed space D is constantly filled with the seal water 7 and maintained at constant pressure. The pressure and circulation volume of the seal water 7 is set so that the second sealed space D is at lower pressure than the adjacent sealed space on the intra-mechanical region A side (the first sealed space C) and higher than the atmospheric region B. For example, when the fluid in the intra-mechanical region A is high-pressure steam at 7.2 MPaG, as described above, the pressure of seal water 6 is set to 7.7 MPaG and the feed/discharge volume of seal water 6 (circulation volume) is set at 96 L/min, as described above, then the pressure of the seal water 7 is set to 3.5 MPaG and the feed/discharge volume of seal water 7 (circulation volume) is set to 61 L/min.

The relative rotational contact portions 51a and 52a of the third mechanical seal 5 are flushed by the seal water 7 supplied to and discharged from the second sealed space D. So as to make this flushing by the seal water 7 performed more efficiently, a ring-shaped third guide projection 23 is formed in the inner-circumference part of the shower ring 77 so that it is disposed at a position that faces the relative rotational contact portions 51a and 52a of the third mechanical seal 5, as shown in FIG. 2. The seal water 7 flows from the feed water holes 78 toward the discharge water holes 79 through the seal water flow path D1; and during this flow, it produces reverse flow 7a just like the reverse flows 6a and 6b in the first sealed space C described above. In other words, in the area around the relative rotational contact portions 51a and 52a of the third mechanical seal 5, the seal water 7 becomes reverse flow 7a guided by the third guide projection 23 toward the relative rotational contact portions 51a and 52a. This reverse flow 7a keeps the seal water 7 flowing without stagnation even in the area around the relative rotational contact portions 51a and 52a, enabling effective flushing of the sealing rings 51 and 52, which include the relative rotational contact portions 51a and 52a.

In this example shown above, the second stationary sealing ring 42 is lengthy in its axial direction; as a result, a long, cylindrical region D2 is produced that extends in the axial direction between the facing circumferential surfaces of the sealing ring 42 and rotary shaft 1 (sleeve 12) in the second sealed space D. However, it is designed so that in order to prevent, as much as possible, the phenomenon of the seal water 7 from being carried along with the rotation of the rotary shaft 1 in this cylindrical region, the frictional coefficient with the seal water 7 is reduced as much as possible by way of surface polishing (electrolytic polishing, buff polishing, etc.) done on the above-described facing circumferential surfaces while setting the interval between the facing circumferential surfaces (the radial direction width of cylindrical region D2) to a largest value possible.

In the shaft-seal device for high-temperature fluid comprised as described above, the intra-seal case region A1 and the high-temperature fluid region A that is the intra-mechanical region are partitioned by the cooling chamber 28. Because the seal case section that forms the outer wall of this cooling chamber 28 (defined by the first holding portion 2d, the second holding portion 2e, the first partition portion 2f, the channel formation portion 2g, the second partition portion 2h, and the O-ring holding portion 2i) is a thin-walled cylindrical body or thin-walled annular plate, the mechanical seal components in the intra-seal case region A1 is cooled effectively by the coolant 82 in the cooling chamber 28. Moreover, the inner-circumference section of the cooling chamber 28 is set near the rotary shaft 1 (axis body 1a), and the intra-seal case region A1 and the high-temperature fluid region A are communicated through the minute annular channel 27 formed between the opposing surfaces of the channel formation portion 2g of the seal case 2 and the rotary shaft 1. Because of this, the high-temperature fluid is in the apparatus housing 8 is cooled effectively while it passes through the annular channel 27 by the coolant 82 in the cooling chamber 28 (and furthermore by the pressure drop caused by passing through the annular channel 27), and the fluid temperature in the intra-seal case region A1 becomes much lower compared to the fluid temperature in the apparatus housing. Therefore, the mechanical seal members to which the high-temperature fluid in the apparatus housing 8 comes in direct contact (such as the O-ring 34 that is interposed between the stationary sealing ring 31 and the seal case 2) do not become exposed to high temperature, preventing heat degradation and heat loss. Also, the seal case 2 installed in the apparatus housing 8 is in such a state that the first and second O-rings 2m and 2n are interposed between the inner and outer circumference end portions of the O-ring holding portion 2i and the sealing member 8a of the apparatus housing 8. Because of this, even if the O-ring (first O-ring) 2m of the inner-circumference end portion side of the holding portion 3i deteriorates and becomes heat-damaged by coming into contact with the high-temperature fluid, the high-temperature fluid leaking out from the first O-ring 2m passes between the O-ring holding portion 2i that is a thin-walled outer wall of the cooling chamber 28 and the sealing member 8a of the apparatus housing 8, and it is cooled sufficiently before reaching the second O-ring 2n. Therefore, the gap between the seal case 2 and the apparatus housing 8 becomes sealed reliably by the second O-ring 2n. Such a cooling function is provided even more effectively by means of the fins 2s and 2t. Because of these, by the above-described shaft-seal device for high-temperature fluid, an extremely good mechanical seal function can be provided even for a rotating machine treating a high-temperature fluid.

Also, in the shaft-seal device for high-temperature fluid as described above, the space between the intra-mechanical region A and the extra-mechanical region (atmosphere region) B is sealed by means of the first and second sealed spaces C and D, which are filled with seal water whose pressure is lowered in stages toward the extra-mechanical region B side. Therefore, even when the fluid in the intra-mechanical region A is a high-pressure fluid such as pressurized steam, the intra-mechanical region A is sealed reliably, and pulsing of the seal water 7 that would be caused by the seal water circulation in the secondary seal, which is a tandem seal, is prevented as much as possible even when the rotary shaft 1 rotates at high speed, and vibration in the rotary shaft 1 and even in the rotation apparatus itself can be reduced greatly.

More specifically, in the present invention, the seal water 7 in the second sealed space D is fed and then discharged through the plurality of feed/discharge water holes 78 and 79 provided in the circumferential direction of the seal case 2 at equal intervals; as a result, pulsing of the seal water 7 is prevented or constrained enough to not generate vibration compared to the feeding and discharge of seal water through one location as in the conventional tandem seals described in the beginning of the present specification even when pumping or conveyance of the seal water 7 occurs in the periphery of the rotational sealing ring (third rotational sealing ring) 52 located within the second sealed space D during its rotation. Furthermore, all the feed/discharge water holes 78 and 79 are connected to the feed/discharge water lines 71 and 73 by means of the first ring-shaped chamber (feed/discharge water channels 75 and 76), the second ring-shaped chamber (header chambers 72a and 74a), and the plurality of feed/discharge connection channels 72b and 74b that communicate the two ring-shaped chambers with each other. Accordingly, abrupt pressure fluctuations are not produced in the feed/discharge water paths which are for the second sealed space D, thus enabling the generation of pulsing to be further effectively suppressed. To achieve this advantage, it is also effective to provide the feed/discharge connection channels 72b and 74b to cross each other in an X shape at an angle of inclination of about 45° as described above. Furthermore, seal water feeding is made radially from the plurality of feed water holes 78, provided at equal intervals in the circumferential direction, toward the outer-circumference surface of the rotational sealing ring (third rotational sealing ring) 52 disposed in the second sealed space D; accordingly, pumping and conveyance phenomena due to the rotation of the rotational sealing ring 52 is mitigated by the seal water 7 that flows from the seal water flow path D1 of the outer periphery of the rotational sealing ring to the feed water holes 78, and the generation of pulsing is suppressed even more effectively. Also, the facing circumference surfaces (cylinder region D2) of the second stationary seal ring 42 and rotary shaft 1 (sleeve 12) is designed so that the frictional coefficient between such surfaces and seal water 7 is reduced by surface polishing and such surfaces are expanded the maximum value as described above; accordingly, pulsing due to the conveyance of the seal water 7 is suppressed effectively.

Furthermore, in the present invention, the seal water 6 and 7 is supplied (sprayed) from the plurality of feed water holes 68 and 78 provided at equal intervals in the circumferential direction into the sealed spaces C and D; accordingly, flushing with the seal water 6 and 7 is more effectively achieved compared to the supply of seal water from a single location on the inner-circumference part of the seal case as in the conventional tandem seal described in the Japanese Utility Model Application Laid-Open (Kokai) No. S63-119969. In addition, the generation of reverse flows 6a, 6b and 7a by the guide projections 21, 22 and 23 further achieves even more effective flushing for the relative rotational contact portions 31a, 32a, 41a, 42a, 51a and 52a of the sealing rings. As seen from the above, according to the shaft-seal device for high-temperature fluid as described above, it is possible to accomplish extremely good sealing function without particular problems even under the conditions of high PV values of high speed and high pressure.

The construction of the shaft-seal device for high-temperature fluid according to the present invention is not limited to the embodiment described above, and the present invention can be improved or altered appropriately without departing from the fundamental principles of the present invention.

For example, the seal case structure having a cooling chamber 28 described above can be applied, in the same manner as the above-described shaft-seal device for high temperature fluid and with the same functional effect, to a shaft-seal device for high-temperature fluid with single mechanical seal structure in which one end-face contact type mechanical seal or non-contact type mechanical seal is in the seal case 2, to a shaft-seal device for high-temperature fluid with double seal or tandem seal structure in which two mechanical seals are disposed parallel, and to a shaft-seal device for high-temperature fluid with four or more mechanical seals disposed parallel.

Figure 7:
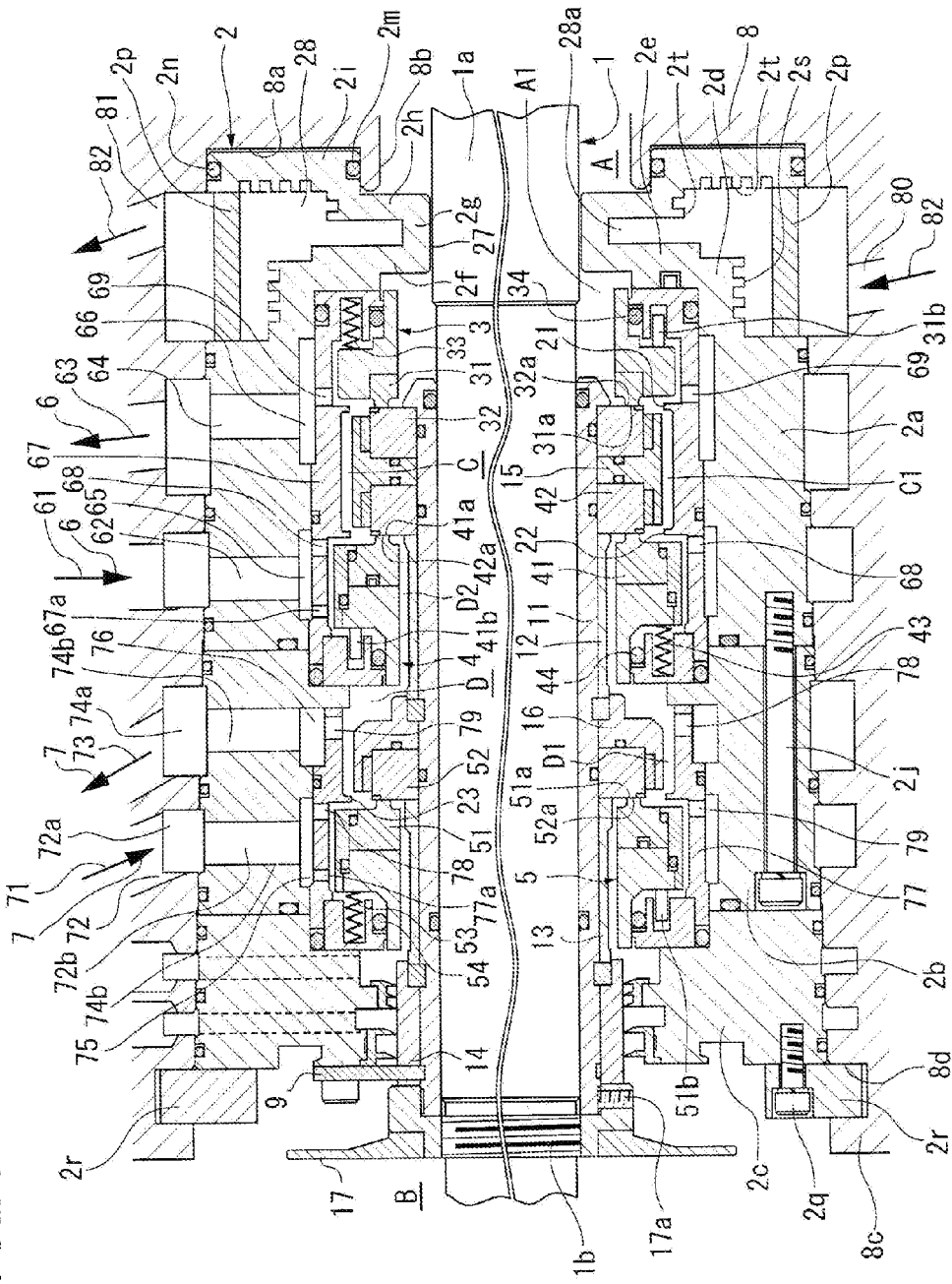
FIG. 7 is a side vertical cross-sectional view of a modified example of the shaft-seal device for high temperature fluid according to the present invention.

Also, in the shaft-seal device described above, the positional relationship in the axial direction of the feed/discharge holes 78 and 79 that are formed in the second sealed space D can be, as shown in FIG. 7, a reverse of the seal device shown in FIG. 1 (hereafter, called the "device of first embodiment") so that the feed water holes 78 are provided to face the outer-circumference surface of the stationary sealing ring (third stationary sealing ring) 51 in the atmosphere region side mechanical seal 5 while the discharge water holes 79 are provided to face the outer-circumference surface of the rotational sealing ring (third rotational sealing ring) 52 in mechanical seal 5. In other words, in the seal device shown in FIG. 7 (hereafter, called the "device of second embodiment"), the feed water holes and feed water channels of the device of first embodiment are used as the discharge water holes 79 and discharge water channels 76, respectively, and the discharge water holes and discharge water channels of the device of first embodiment are used as the feed water holes 78 and feed water channels 75, respectively. Furthermore, in the device of second embodiment, the feed water header chamber and discharge water header chamber of the first embodiment are used as the feed water header chamber 72a and discharge water header chamber 74a "as is," and the feed/discharge water channels 75 and 76 and the feed/discharge water header chamber 72a and 74a are respectively communicated by the plurality of feed/discharge connection channels 72a and 74a that do not cross each other.

Figure 9:
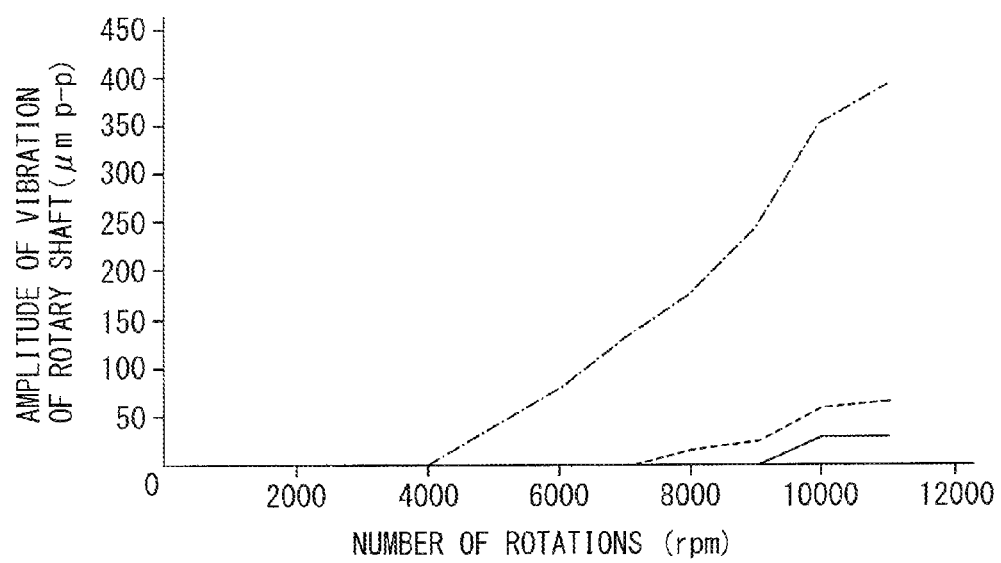
FIG. 9 is a graph of experimental data on the shaft-seal device for high temperature fluid according to the present invention, showing the relationship between the number of rotations (rpm) and the amplitude of vibration of a rotary shaft.

The device of second embodiment is slightly inferior in terms of preventing the pulsing compared to the device of first embodiment; however, it still is able to provide a pulse suppression effect much greater than that of the conventional tandem seals. This is confirmed by experiments. More specifically, experiments were conducted using the devices of first and second embodiments and a seal device (hereafter, the "comparison device") that has the same structure as the device of second embodiment except that the number of the feed/discharge water holes opened to the second sealed space D was set to one each, and each of the feed/discharge water hole was connected to its own feed/discharge water line by a single feed/discharge water path, and the amplitude of vibration of the rotary shaft 1 was measured while changing the number of rotations (rpm) of the rotary shaft 1 under the identical conditions. The results are shown in FIG. 9. FIG. 9 shows the relationship between the number of rotations (rpm) of the rotary shaft 1 and the amplitude of vibration (μm p-p) that is indicated by the solid line for the device of first embodiment, by the dotted line for the device of second embodiment, and by the dot-dash line for the comparison device. The experimental results show that it was difficult to obtain good operation with the comparison device because the amplitude of vibration increased as the speed rotation of the rotary shaft increased. However, the vibration of the rotary shaft 1 was effectively suppressed in the devices of first and second embodiments even under the condition of high-speed rotation, and in the device of first embodiment in particular the vibration of the rotary shaft 1 was greatly suppressed.

Figure 8:
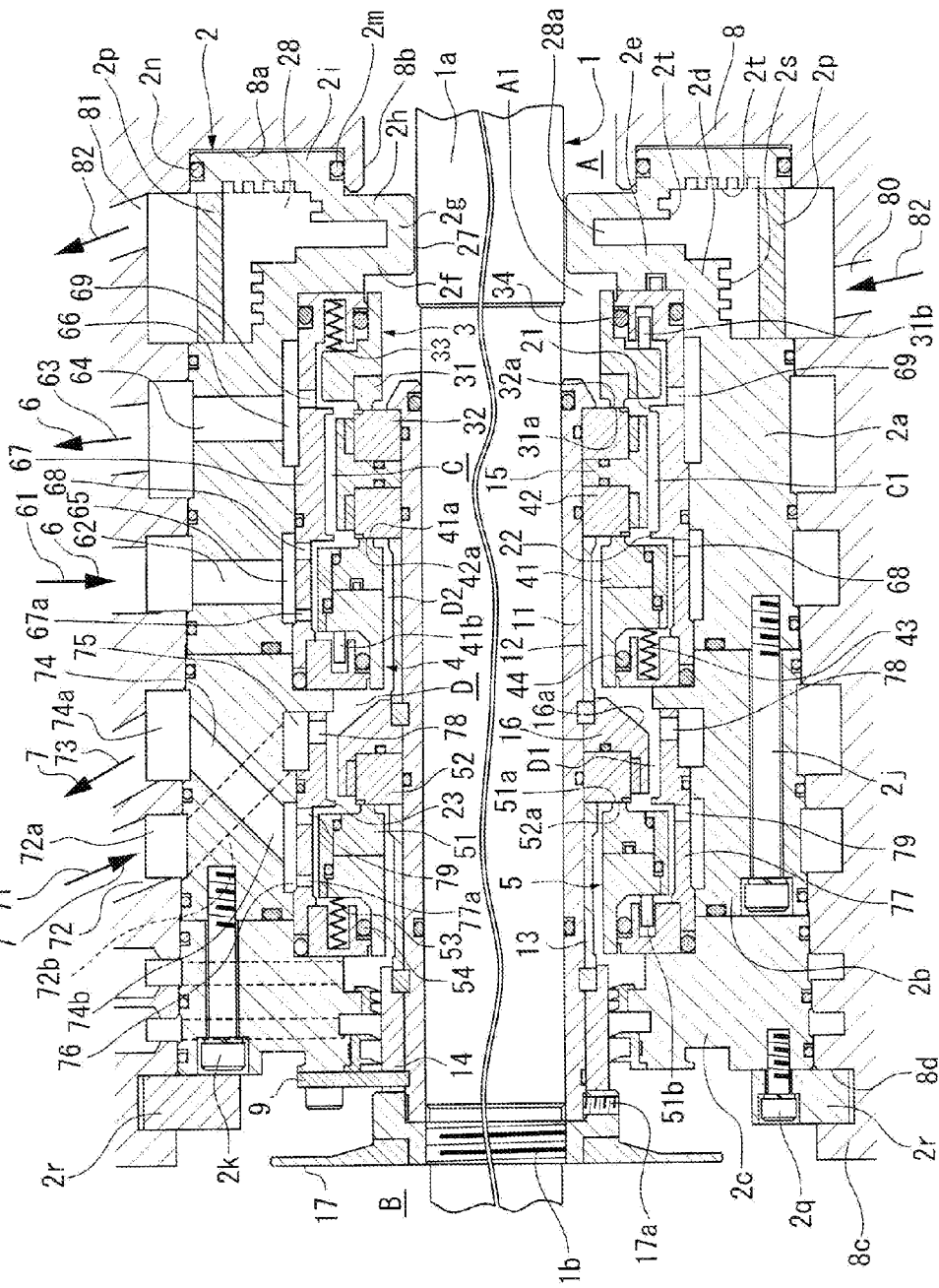
FIG. 8 is a side vertical-cross sectional view of another modified example of the shaft-seal device for high temperature according to the present invention.

In order to suppress the pumping and conveyance phenomena of the seal water 7 due to the rotational sealing ring 52 in the second sealed space D, it is effective to give a consideration to the shape of the rotational sealing ring 52 in the devices of first and second embodiments. FIG. 8 shows an example. In FIG. 8, the rear surface of the holding ring 16, i.e., the rear surface of the rotational sealing ring 52, in the device of first embodiment is shaped into an inclined surface 16a whose diameter gradually decreases toward the intra-mechanical region A; as a result, the occurrence of pumping and conveyance phenomena of the seal water 7 caused by the rotation of the rotational sealing ring 52 is suppressed as much as possible.

Also, the primary seal of the shaft-seal device of the second aspect of the present invention shown in FIGS. 1, 7, and 8 comprises the shaft-seal device of the first aspect of the present invention. This shaft-seal device of the first aspect of the present invention can be applied to a shaft-seal device that includes one mechanical seal, and also, it can be applied as a second mechanical seal 4 or a third mechanical seal 5 of the shaft-seal device of the second aspect of the present invention. Furthermore, it can also be applied as a mechanical seal in a shaft-seal device, in which two mechanical seals are disposed parallel (tandem seal or double seal), or a shaft-seal device in which four or more mechanical seals are disposed parallel.

The invention claimed is:

1. A shaft-seal device for high-temperature fluid having a primary seal, a secondary seal, and a tertiary seal disposed at equal intervals to form a mechanical seal in a seal case installed in an apparatus housing, the mechanical seal exhibiting a sealing performance through a relative rotation effect between sealing end-faces that are facing end-faces of:
rotational sealing rings fixed to a rotary shaft passing through the seal case, and stationary sealing rings fit and held in the seal case with O-rings in between and facing the rotational sealing rings in a displaceable manner in an axis direction of said rotary shaft, and seal water whose pressure is lower than a fluid pressure of an intra-apparatus housing region being circulated and supplied to each of a first sealed space formed between the primary seal and the secondary seal and a second sealed space formed between the secondary seal and the tertiary seal, wherein the seal case takes a metal structure comprising
- a main body portion that is a cylindrical body,
- a first holding portion that is a cylindrical body, extending from an inner-circumference edge portion of an end portion of said main body portion toward an intra-apparatus housing region direction as a single unit,
- a second holding portion that is an annular plate, extending from an end portion of the first holding portion in a radial direction inwardly as a single unit,
- a first partition portion that is an annular plate, extending from an inner-circumference end portion of the second holding portion in a radial direction inwardly as a single unit,
- a channel formation portion that is a cylindrical body extending from an inner-circumference end portion of the first partition portion in an intra-apparatus housing region direction as a single unit and forms a minute annular channel between an outer circumference surface of said rotary shaft,
- a second partition portion that is an annular plate, extending from an end portion of the channel formation portion toward a radial direction outwardly as a single unit, and
- an O-ring holding portion that is an annular plate extending from an outer-circumference end portion of the second partition portion in a radial direction outwardly as a single unit and has an outside diameter coincide with the main body portions; and wherein the seal case is fitted in the apparatus housing in a state in which first and second O-rings are interposed between inner- and outer-circumference edge portions of the O-ring holding portion and a sealing member of the apparatus housing, a cooling chamber is provided as an indentation formed between main body portion and the O-ring holding portion and closed by a feed and discharge path formation portion set up in the apparatus housing, a coolant is supplied to and discharged from the cooling chamber through feed/discharge coolant paths formed in the feed and discharge path formation portion, and an intra-seal case region, in which said sealing rings are provided, and a high-temperature fluid region, which is an intra-apparatus housing region, are partitioned by a cooling chamber section that is an inner-circumference section of said cooling chamber and surrounded by both partitioned sections and the channel formation portion, and said shaft-seal device further comprises a first water feed/discharge means for circulating and supplying the seal water to the first sealed space and a second water feed/discharge means for circulating and supplying the seal water to the second sealed space, each of which being comprised of a feed water path formed in the main body portion of the seal case, a discharge water path formed in said main body portion, an annular feed water channel formed in an inner-circumference surface of said main body portion and communicating with the feed water path, an annular discharge water channel formed on an inner-circumference surface of said main body portion and communicating with the discharge water path, a shower ring installed in an inner-circumference surface of said main body portion to close and seal openings of the feed/discharge water channels, feed water holes that are multiple through-holes communicating with a feed water channel and provided in the shower ring at equal intervals in a circumferential direction thereof, and discharge water holes that are multiple through-holes communicating with the discharge water channel and provided in the shower ring at equal intervals in a circumference direction thereof; and each of the first and second water feed/discharge suppresses a pulsing phenomenon of the seal water accompanying a supply and circulation in the sealed space by supplying the seal water supplied from the feed water path to the feed water channel to all feed water holes in the sealed space, and discharging the seal water in the sealed space from all discharge water holes to the discharge water path through the discharge water channel, and wherein in the second water feed/discharge means,
the feed water holes are provided facing an outer-circumference surface of one of the rotational and stationary sealing rings in the tertiary seal, and
the discharge water holes are provided facing an outer-circumference surface of another one of the rotational and stationary sealing rings in the tertiary seal.

2. The shaft-seal device for high-temperature fluid according to claim 1 wherein in the second water feed/discharge means,
the feed water path comprises
an annular feed water header chamber that communicates with a feed water line, and
multiple feed water connection channels that are provided at equal intervals along a circumferential direction so that they communicate the feed water header chamber with the feed water channel closed by the shower ring, and
the discharge water path comprises
an annular discharge water header chamber that communicates with a discharge water line, and
multiple discharge water connection channels that are provided at equal intervals along a circumferential direction so that they communicate the discharge water header chamber with the discharge water channel closed by the shower ring.

3. The shaft-seal device for high-temperature fluid according to claim 1 wherein
in the second water feed/discharge means,
the feed water holes are provided facing an outer-circumference surface of one of the rotational and stationary sealing rings in the tertiary seal, and
the discharge water holes are provided facing an outer-circumference surface of another one of the rotational and stationary sealing rings in the tertiary seal,
the feed water path comprises
an annular feed water header chamber that communicates with a feed water line, and
multiple feed water connection channels that are provided at equal intervals along a circumferential direction so that they communicate the feed water header chamber with the feed water channel closed by the shower ring, and the discharge water path comprises an annular discharge water header chamber that communicates with a discharge water line, and multiple discharge water connection channels that are provided at equal intervals along a circumferential direction so that they communicate the discharge water header chamber with the discharge water channel closed by the shower ring.

4. The shaft-seal device for high-temperature fluid according to claim 2 wherein in the second water feed/discharge means, the feed water connection channels and the discharge water connection channels are provided to cross each other in an X shape in terms of a cross section passing through an axis line of the rotary shaft.

5. The shaft-seal device for high-temperature fluid according to claim 3 wherein in the second water feed/discharge means, the feed water connection channels and the discharge water connection channels are provided to cross each other in an X shape in terms of a cross section passing through an axis line of the rotary shaft.

6. A shaft-seal device for high-temperature fluid 2 having a mechanical seal provided in a seal case installed in an apparatus housing, the mechanical seal exhibiting a sealing performance through a relative rotation effect between sealing end-faces that are facing end-faces of:

rotational sealing rings fixed to a rotary shaft passing through said seal case, and stationary sealing rings fit and held in said seal case with O-rings in between and facing said rotational sealing ring in a displaceable manner in an axis direction of said rotary shaft, wherein the seal case takes a metal structure comprising a main body portion that is a cylindrical body, a first holding portion that is a cylindrical body, extending from an inner-circumference edge portion of an end portion of said main body portion toward an intra-apparatus housing region direction as a single unit, a second holding portion that is an annular plate extending from an end portion of the first holding portion in a radial direction inwardly as a single unit, a first partition portion that is an annular plate extending from an inner-circumference end portion of the second holding portion in a radial direction inwardly as a single unit, a channel formation portion that is a cylindrical body extending from an inner-circumference end portion of the first partition portion in an intra-apparatus housing region direction as a single unit and forms a minute annular channel between an outer circumference surface of said rotary shaft, a second partition portion that is an annular plate, extending from an end portion of the channel formation portion toward a radial direction outwardly as a single unit, and an O-ring holding portion that is an annular plate extending from an outer-circumference end portion of the second partition portion in a radial direction outwardly as a single unit and has an outside diameter coincide with the main body portions, and wherein the seal case is fitted in the apparatus housing in a state in which first and second O-rings are interposed between inner- and outer-circumference edge portions of the O-ring holding portion and a sealing member of the apparatus housing, a cooling chamber is provided as an indentation formed between said main body portion and the O-ring holding portion and closed by a feed and discharge path formation portion set up in the apparatus housing, a coolant is supplied to and discharged from the cooling chamber through feed/discharge coolant paths formed in the feed and discharge path formation portion, and an intra-seal case region, in which said sealing rings are provided, and a high-temperature fluid region, which is an intra-apparatus housing region, are partitioned by a cooling chamber section that is an inner-circumference section of said cooling chamber and surrounded by both partitioned sections and the channel formation portion, and wherein said shaft-seal device has a cartridge structure in which a part of said rotary shaft in the seal case is comprised of a shaft main body and sleeves provided on the shaft main body, said feed and discharge path formation portion is a cylindrical body that holds therein the seal case in a surrounding state, one of the sleeves is provided on the rotary shaft by using a removable set catch that connects as a unit the sleeve, on which a rotating side element including the rotational sealing rings is installed, and the seal case, on which a stationary side element including the stationary sealing ring is installed, and the seal case is installed in the apparatus housing by fitting the seal case to the feed and discharge path formation portion to be held, and engaging an annular ring divided in a circumferential direction that is installed at an end portion of the seal case with annular indentation formed in an inner-circumference end portion of the feed and discharge path formation portion.

7. The shaft-seal device for high-temperature fluid according to claim 1 wherein said shaft-seal device has a cartridge structure in which a part of said rotary shaft in the seal case is comprised of a shaft main body and sleeves provided on the shaft main body, said feed and discharge path formation portion is a cylindrical body that holds therein the seal case in a surrounding state, one of the sleeves is provided on the rotary shaft by using a removable set catch that connects as a unit the sleeve, on which a rotating side element including the rotational sealing rings is installed, and the seal case, on which a stationary side element including the stationary sealing ring is installed, and the seal case is installed in the apparatus housing by fitting the seal case to the feed and discharge path formation portion to be held, and engaging an annular ring divided in a circumferential direction that is installed at an end portion of the seal case with annular indentation formed in an inner-circumference end portion of the feed and discharge path formation portion.

8. The shaft-seal device for high-temperature fluid according to claim 1 or 6 wherein multiple metal reinforcement rods provided at equal intervals in a circumferential direction are welded between facing end-faces of the main body portion and the O-ring holding portion of the seal case.

9. The shaft-seal device for high-temperature fluid according to claim 1 or 6 wherein a plurality of protruding fins are provided as a unit in the first holding portion and an inner-circumference surface of the O-ring holding portion of the seal case.

10. The shaft-seal device for high-temperature fluid according to claim 1 or 6 wherein
- multiple metal reinforcement rods provided at equal intervals in a circumferential direction are welded between facing end-faces of the main body portion and the O-ring holding portion of the seal case; and
- a plurality of protruding fins are provided as a unit in the first holding portion and an inner-circumference surface of the O-ring holding portion of the seal case.

\* \* \* \* \*